(12) United States Patent
Albou

(10) Patent No.: US 12,203,620 B2
(45) Date of Patent: Jan. 21, 2025

(54) SYSTEM FOR PROJECTING A LIGHT BEAM

(71) Applicant: VALEO VISION, Bobigny (FR)

(72) Inventor: Pierre Albou, Bobigny (FR)

(73) Assignee: Valeo Vision, Bobigny (FR)

( * ) Notice: Subject to any disclaimer, the term of this patent is extended or adjusted under 35 U.S.C. 154(b) by 77 days.

(21) Appl. No.: 17/787,484

(22) PCT Filed: Dec. 20, 2020

(86) PCT No.: PCT/EP2020/087552
§ 371 (c)(1),
(2) Date: Jun. 20, 2022

(87) PCT Pub. No.: WO2021/123459
PCT Pub. Date: Jun. 24, 2021

(65) Prior Publication Data
US 2024/0027045 A1    Jan. 25, 2024

(30) Foreign Application Priority Data

Dec. 20, 2019 (FR) ........................................ 1915146

(51) Int. Cl.
*F21S 41/27* (2018.01)
*F21S 41/143* (2018.01)
(Continued)

(52) U.S. Cl.
CPC ............. *F21S 41/27* (2018.01); *F21S 41/143* (2018.01); *F21S 41/153* (2018.01); *F21S 41/663* (2018.01)

(58) Field of Classification Search
CPC .......... F21S 41/25; F21S 41/27; F21S 41/143; F21S 41/153
See application file for complete search history.

(56) References Cited

U.S. PATENT DOCUMENTS 6,424,786 B1    7/2002  Beeson et al.
10,400,972 B2   9/2019  Courcier
(Continued)

FOREIGN PATENT DOCUMENTS

CN    103090286 A    5/2013
CN    110778977 A    2/2020
(Continued)

OTHER PUBLICATIONS

Marcel Philipp Held, Gerolf Kloppenburg, and Roland Lachmayer "Micro pixel LEDs: design challenge and implementation for high-resolution headlamps", Proc. SPIE 10940, Light-Emitting Devices, Materials, and Applications, 109401U (Mar. 1, 2019); https://doi.org/10.1117/12.2509336.
(Continued)

*Primary Examiner* — Eric T Eide
(74) *Attorney, Agent, or Firm* — Valeo Vision

(57) ABSTRACT

The invention relates to a lighting system including a pixelated light source provided with a plurality of selectively activatable emissive elements, each having a rectangular shape with a height dimension and a width dimension, the width dimension being the same for all the emissive elements, and an optical device having an optical axis and configured to project an image of each of the emissive elements. The optical device configured such that the images have a width dimension that increases non-linearly moving away from the optical axis.

11 Claims, 5 Drawing Sheets

(51) Int. Cl.
*F21S 41/153* (2018.01)
*F21S 41/663* (2018.01)

(56) References Cited

U.S. PATENT DOCUMENTS

| | | |
|---|---|---|
| 10,731,817 B2 | 8/2020 | Pellarin et al. |
| 11,036,035 B2 | 6/2021 | Won et al. |
| 11,230,224 B2* | 1/2022 | Kim .................. F21S 41/153 |
| 11,705,541 B2 | 7/2023 | Miyamoto |
| 2015/0323733 A1 | 11/2015 | Suzuki |
| 2016/0356444 A1* | 12/2016 | Ohno .................. F21S 41/285 |
| 2018/0087732 A1* | 3/2018 | De Lamberterie ..... F21S 41/26 |
| 2018/0245757 A1* | 8/2018 | Kanayama ........... F21S 41/255 |
| 2019/0145596 A1* | 5/2019 | Suetsugu ............. F21S 41/663 362/521 |
| 2019/0203897 A1 | 7/2019 | Kim et al. |
| 2019/0234572 A1* | 8/2019 | Courcier ............. F21S 41/265 |
| 2019/0323671 A1 | 10/2019 | Lin |

FOREIGN PATENT DOCUMENTS

| | | |
|---|---|---|
| DE | 102012 A1 | 11/2012 |
| DE | 102012008833 A1 | 11/2012 |
| DE | 102016 A1 | 9/2017 |
| DE | 102016103649 A1 | 9/2017 |
| DE | 102018 A1 | 2/2020 |
| DE | 102018119312 A1 | 2/2020 |
| JP | 5297338 A | 11/1993 |
| JP | 2000009995 A | 1/2000 |
| JP | 2007288169 A | 11/2007 |
| JP | 2007305340 A | 11/2007 |
| JP | 2014126604 A | 7/2014 |
| JP | 2017162760 A | 9/2017 |
| JP | 2020181936 A | 11/2020 |
| WO | 2017148764 A1 | 9/2017 |
| WO | 2018225376 A1 | 12/2018 |

OTHER PUBLICATIONS

European Patent Office, International Search Report (with English translation) and Written Opinion of corresponding International Application No. PCT/EP2020/087552, dated Feb. 19, 2021.
Japan Patent Office, Office Action (including English translation) for corresponding Patent Application No. JP2022-537531, dated Jun. 20, 2023.
China Patent Office, First Office Action (with English translation) of corresponding Chinese Patent Application No. 202080090013.6, dated Jan. 25, 2024.
Japan Patent Office, Written Opposition (including English translation) for corresponding Japanese Patent Application No. JP2022-537531, dated Oct. 4, 2024.

* cited by examiner

SYSTEM FOR PROJECTING A LIGHT BEAM

CROSS-REFERENCE TO RELATED APPLICATIONS

This application is filed under 35 U.S.C. § 371 U.S. National Phase of International Application No. PCT/EP2020/087552 filed Dec. 22, 2020 (published as WO2021123459), which claims priority benefit to French application No. 1915146 filed on Dec. 20, 2019, the disclosures of which are herein incorporated by reference in their entirety.

TECHNICAL FIELD

The present invention relates to the field of lighting and/or signaling and to the units, optical units in particular, that contribute thereto. It is particularly advantageously applicable to the field of motor vehicles.

BACKGROUND OF THE INVENTION

In the automotive sector, devices capable of emitting light beams, also called lighting and/or signaling functions, that generally comply with regulations, are known.

Technologies that make it possible to produce a segmented beam, also called a pixelated beam, for implementing advanced lighting functions, have recently been developed. This is especially the case for a "complementary beam" lighting function, which is generally based on a plurality of illuminating units each comprising one light-emitting diode, which diodes may be driven individually. This beam may in particular be used to supplement the lighting provided by a dipped beam, so as to form driving lighting.

BRIEF SUMMARY OF THE INVENTION

The beam, which results from the various beam segments generated by each of the diodes, is projected by way of a projecting optical system generally comprising one or more lenses. For example, it is possible to produce a complementary beam, which is associated with a basic beam that is entirely or at least mainly projected below a horizontal cut-off line of the type used for the low-beam function, the complementary beam being added to the basic beam so as to complete it above the cut-off line; advantageously, this high beam is adaptive, i.e. certain portions of the projected overall beam may be turned on or off, for example for anti-glare functions. The acronym ADB (for Adaptive Driving Beam) is used for this type of function.

In the present description, a beam the projection of which forms an image composed of beam segments, each segment being able to be turned on independently, is called a segmented beam. A pixelated light source may be employed to form these segments. Such a source comprises a plurality of selectively activatable emissive elements. The emissive elements are typically placed beside one another on a carrier, with a certain pitch.

In an ideal situation, the resolution of the light sources (that is to say the number of pixels) is unlimited so that it is possible to cover a wide visual field while having a high light intensity. In particular, for sources having pixels of a given power, it is enough to increase the number of pixels to widen the field.

In practice, reasons regarding limiting complexity and cost price require light sources that are as small as possible to be sought. At the same time, the aim of sufficient resolution and the targeted light intensity (very generally imposed by regulations) do not allow a large reduction in the number of pixels, and therefore in the cost price of such technologies.

One aim of the present invention is therefore to propose a solution to this problem by allowing a satisfactory light intensity for a sufficiently wide visual field, with a pixelated source of controlled size.

Other aims, features and advantages of the present invention will become apparent on examining the following description and the accompanying drawings. It will be understood that other advantages may be incorporated.

To achieve this aim, according to one embodiment, provision is made for a lighting system comprising a pixelated light source equipped with a plurality of selectively activatable emissive elements each having a rectangular shape with a height dimension and a width dimension, the width dimension being identical for all of the emissive elements, and an optical device having an optical axis and configured to project an image of each of the emissive elements, characterized in that the optical device is configured such that the images have a width dimension that increases non-linearly moving away from the optical axis.

This thus produces a segmented beam, resulting from the light projection deriving from the plurality of emissive elements, with a spatial modulation of the intensity and of the surface spread of the images produced by each of the emissive elements.

The spread of the images is understood to mean an increase in at least one width dimension thereof the further away the images are from the optical axis. Thus, the width of the images is greater at the periphery than in the center, that is to say on the optical axis and in the vicinity thereof. This arrangement makes it possible to obtain a given visual field, with a reduced number of pixels, that is to say emissive elements. The increase in the dimension of the images makes it possible to compensate for a reduction in the number thereof.

At the same time, the light intensity of the images is also modulated so as not to penalize the level of illumination produced by the system, in particular in the main region of interest, which is formed on the optical axis and in its vicinity. In particular, it is in this region, toward the center of the beam projected ahead of a vehicle, that it is generally most useful to have a high brightness. To achieve this, the images have smaller dimensions in the vicinity of the optical axis, thereby concentrating the light there and keeping the brightness at an acceptable level.

One means used to achieve this magnification of the images and the pixels consists in creating a distortion, preferably resulting in a non-linear magnification toward the edges of the field of view. While distortion is generally perceived as a defect in an optical system, it is used here intentionally to modulate the size and the light intensity of the images.

Optionally, the first derivative of a function of the width dimension of an image with respect to the angular position of the image along an axis parallel to the large width of the total illuminated field is equal to zero on the optical axis.

By virtue of this optional provision, the light intensity on the optical axis and in the vicinity thereof may be kept at a high level.

Advantageously, the optical device is configured such that the images have a width dimension that increases non-linearly, and possibly in a manner greater than a linear increase, starting from a certain image angle (or width coordinate), moving away from the optical axis for at least one peripheral group of the images.

When this aspect is implemented, the increase in the width dimension of the images is greater than it would be if the increase were to be linear at least starting from a certain coordinate of the image in the width direction. This provision may be implemented at least over a portion of the projected beam located at the periphery, that is to say over a region extending up to the contour of the beam. It is thus possible to quickly increase the size of the images in order to produce a large spread, and therefore a higher angular field for the beam. This arrangement may optionally be used over the entire beam, from the optical axis. However, the increase is preferably lower starting from the center (on the optical axis) so as to keep small image sizes there, and therefore a high light intensity. To this end, the increase may be very gradual at the beginning (starting from the optical axis) with a low image width derivative (for example slower than a linear variation, possibly starting from a zero derivative value at the center), and then increase moving away from the optical axis, so as to reach a derivative greater than a linear increase.

Another aspect relates to an optical device able to be used in the system. Provision may be made for an optical device having an optical axis and configured to project an image of each of the emissive elements of a pixelated light source, the optical device advantageously being configured such that the images have a width dimension that increases non-linearly moving away from the optical axis.

The optical device may, in one embodiment, comprise an input optical unit and an output optical unit. In one preferred case, the input optical unit produces a distortion of the light beam, and it is possible in particular to use a lens exit face of this unit, formed with a convex, preferably spherical and high curvature to create a strong spatial dispersion of rays having a large radial component.

The output optical unit may be of lower optical power.

Another aspect relates to a motor vehicle equipped with at least one system and/or with at least one optical device.

BRIEF DESCRIPTION OF THE DRAWINGS

The aims, objects, features and advantages of the invention will become more clearly apparent from the detailed description of one embodiment of the latter, which embodiment is illustrated by the following accompanying drawings, in which.

Figure 1:
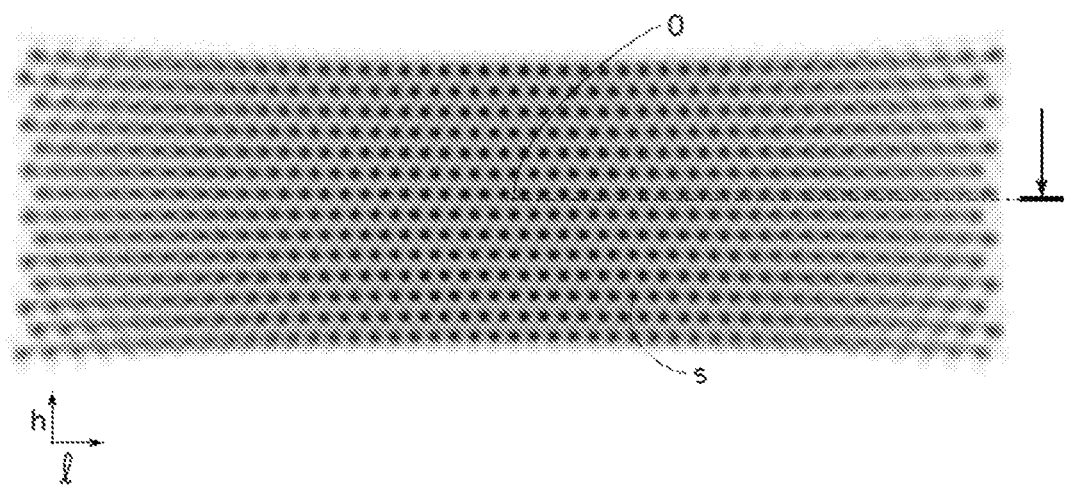
FIG. 1 shows one example of projection of a light beam in a plane, with a distribution of spread and light intensity of images of a pixelated source.

The drawings are given by way of example and do not limit the invention. They are schematic conceptual depictions intended to facilitate understanding of the invention and are not necessarily drawn to the scale of practical applications.

DETAILED DESCRIPTION OF THE INVENTION

Before starting a detailed review of embodiments of the invention, optional features that may optionally be used in combination therewith or alternatively thereto will be described below:
- the optical device comprises an input optical unit 2 receiving light from the plurality of emissive elements and an output optical unit 3 receiving light from the input optical unit 2 and projecting the images S of each of the emissive elements;
- the input optical unit 2 comprises a converging lens that has a radius of curvature/useful aperture radius ratio of less than 1.175 on its light exit face;
- the converging lens is made of a material having a refractive index, at a wavelength of 587.56 nm, greater than 1.7;
- the output optical unit 3 is convergent and exhibits inverted chromaticism, that is to say that the position of the focal point on the optical axis as a function of wavelength varies in the opposite direction with respect to what it does in the case of a simple converging (refractive) lens. The unit 3 is overcorrected in terms of axial chromaticism;
- the focal length of the output optical unit 3 is greater than the focal length of the input optical unit 2;
- the output optical unit 3 comprises at least two lenses;
- the output optical unit 3 comprises a diffractive optical element;
- the plurality of emissive elements forms a rectangular matrix array, the long dimension of the rectangular matrix array being directed along the width dimension. The width dimension corresponds to the width of the beam;
- the width dimension is directed along the horizon line; and
- the emissive elements have an identical height dimension. Optionally, the height dimension is equal to the width dimension, meaning that the emissive elements have a square cross section.

The system according to the invention comprises a unit for driving the activation of each of the emissive elements, configured to produce at least one dark region in a projected beam by deactivating a group of adjacent emissive elements, the driving unit being configured to determine the number of emissive elements of the group of adjacent emissive elements corresponding to the dark region as a function of the width dimension of the emissive elements.

A computer program product, preferably stored in a non-transitory memory, comprises instructions that, when they are executed by a processor, make it possible to determine the emissive elements to be activated, in particular in order to obtain at least one dark region (in which the elements are not activated) of a determined area, taking into account the variable area of the images of the elements.

In the features described below, terms relating to verticality, horizontality and transversality (or even the lateral direction), or equivalents thereof, are to be understood with respect to the position in which the lighting system is intended to be fitted in a vehicle. The terms "vertical" and "horizontal" are used in the present description to designate, regarding the term "vertical", a direction with an orientation perpendicular to the plane of the horizon (which corresponds to the height of the systems), and, regarding the term "horizontal", a direction with an orientation parallel to the plane of the horizon. They are to be considered under the conditions of operation of the device in a vehicle. The use of these words does not mean that slight variations about the vertical and horizontal directions are excluded from the invention. For example, an inclination relative to these directions of the order of + or −10° is here considered to be a minor variation about the two preferred directions. With respect to the horizontal plane, the inclination is in principle between −5° and +4°, and it is between −6° and +7.5° laterally.

Generally speaking, the refractive indices whose values are given by way of example correspond to values that would be measured at a wavelength of 587.56 nm (sodium D-line).

Motor-vehicle headlamps may be equipped with one or more lighting systems arranged in a housing closed by an outer lens so as to obtain one or more lighting and/or signaling beams at output from the headlamp.

The invention may contribute to a driving beam function whose purpose is to illuminate the scene in front of the vehicle over a wide area, but also over a substantial distance, typically around two hundred meters. This light beam, due to its lighting function, is mainly located above the horizon line. It may for example have a slightly upward sloping lighting optical axis. In particular, it may be used to generate a "complementary beam" lighting function that forms a portion of a driving beam additional to that produced by a near-field beam, the complementary driving beam seeking entirely, or at least mostly, to illuminate above the horizon line, whereas the near-field beam (which may have the specific features of a low beam) seeks to illuminate entirely, or at least mostly, below the horizon line.

The device may also be used to form other lighting functions via or apart from those described above in relation to adaptive beams.

It is specified that, in the context of the present invention, the term "image" is understood to mean the projection resulting from at least part of the light from an emissive element via the optical device of the invention in a plane located at a predetermined distance downstream of the optical device and perpendicular to the optical axis thereof. Typically, such a plane has a vertical orientation at the front of a motor vehicle (or possibly at the rear) at a given distance from said vehicle. The variation in dimension of the images at a given distance from the optical device makes it possible to modulate the angular spread of the beam and the light intensity according to the regions of the beam.

It should be noted that the plurality of emissive elements may be controlled so as to be activated selectively. This means that all the emissive elements are not necessarily active, i.e. emit light, simultaneously. This function allows the shape of the generated beam to be modulated. If an emissive element is not activated, its image, such as projected by the optical device, will be absent. It then forms an illumination vacuum in the resulting overall beam. This vacuum is understood not to count coupling phenomena at the source and effects of the parasitic light of the optics.

The source 1 preferably comprises a carrier, one face of which bears selectively activatable emissive elements 11, for example based on LED technologies, as described in detail below.

Figure 3A:
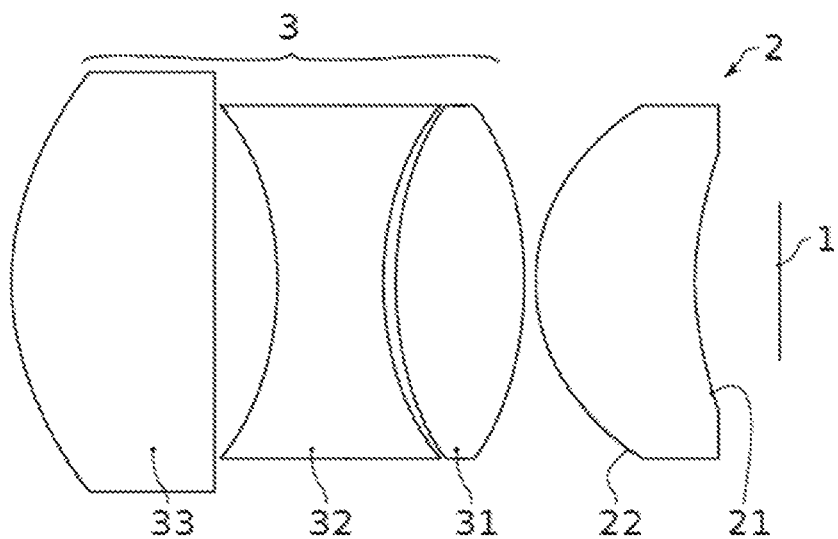
FIG. 3A and FIG. 3B show a first embodiment of an optical device.

As shown schematically in FIG. 3A, the light source 1 is advantageously centered on, and perpendicular to, the optical axis of the optical device 3, represented here by a group of lenses. The optical axis may be oriented substantially horizontally.

The light source 1 may in particular be designed in the form of a matrix array of emissive elements whose activation may be driven individually, so as to switch off or switch on any one of the emissive elements. The shape of the resulting beam may thus be varied with a very high degree of flexibility. Purely by way of illustration, it is possible to implement a matrix array of emissive elements, for example forming 2464 pixels or even more, arranged in rows and columns, for example 28 rows and 88 columns. Depending on the optical parameters, in particular distortion parameters, for spreading the images of the pixels, it is thus possible for example to obtain a visual effect equivalent to that of a source having a matrix array of 28 rows and 132 columns.

In a manner known per se, the present invention may use light-emitting diodes (also commonly called LEDs) as light sources. These may potentially be one or more organic LEDs. These LEDs may in particular be provided with at least one chip using semiconductor technology and able to emit light. Moreover, the expression light source is here understood to mean a set of at least one elementary source such as an LED able to produce a flux leading to the generation of at least one light beam at the output of the module of the invention. In one advantageous embodiment, the exit face of the source is of rectangular cross section, this being typical for LED chips.

The light-emitting source preferably comprises at least one monolithic matrix array of light-emitting elements, also called a monolithic matrix array. In a monolithic matrix array, the light-emitting elements are grown from a common substrate, or have been transferred thereto, and are electrically connected so as to be able to be activated selectively, individually or in subsets of light-emitting elements. The substrate may be made mainly of semiconductor material. The substrate may comprise one or more other materials, which are for example non-semiconductors. Each light-emitting element or group of light-emitting elements may thus form a luminous pixel and is able to emit light when its or their material is supplied with electricity. The configuration of such a monolithic matrix array makes it possible to arrange selectively activatable pixels very close to each other, in comparison with conventional light-emitting diodes that are intended to be soldered onto printed circuit boards. The monolithic matrix array within the sense of the invention comprises light-emitting elements a main dimension of elongation of which, specifically the height, is substantially perpendicular to a common substrate, this height being at most equal to one micrometer.

Advantageously, the one or more monolithic matrix arrays able to emit light rays may be coupled to a control unit for controlling the light emission of the pixelated source. The control unit may thus control (this may also be called drive) the generation and/or the projection of a pixelated light beam by the lighting device. The control unit may be integrated into the lighting device. The control unit may be mounted on one or more of the matrix arrays, the assembly thus forming a lighting module. The control unit may comprise a central processing unit coupled to a memory storing a computer program that comprises instructions allowing the processor to perform steps that generate signals for controlling the light source. The control unit may thus for example individually control the light emission of each pixel of a matrix array. Furthermore, the luminance obtained by the plurality of light-emitting elements is at least 60 Cd/mm2, preferably at least 80 Cd/mm2.

The control unit may form an electronic device able to control the light-emitting elements. The control unit may be an integrated circuit. An integrated circuit, also called an electronic chip, is an electronic component that reproduces one or more electronic functions and is able to integrate several types of basic electronic component, for example in a limited volume (i.e. on a wafer). This makes the circuit easy to implement. The integrated circuit may be for example an ASIC or an ASSP. An ASIC (acronym for application-specific integrated circuit) is an integrated circuit developed for at least one specific application (i.e. for one customer). An ASIC is therefore a specialized (microelectronic) integrated circuit. Generally speaking, it groups together a high number of unique or made-to-measure functions. An ASSP (acronym for application-specific standard product) is an integrated (microelectronic) electronic circuit that groups together a large number of functions in order to satisfy a generally standardized application. An ASIC is designed for a more particular (specific) need than an ASSP. The monolithic matrix arrays are supplied with electricity via the electronic device, which is itself supplied with electricity using for example at least one connector connecting it to an electricity source. The electricity source may be internal or external to the device according to the invention. The electronic device supplies electricity to the light source. The electronic device is thus able to control the light source.

According to the invention, the light source preferably comprises at least one monolithic matrix array whose light-emitting elements extend projecting from a common substrate. This arrangement of elements may result from growth on the substrate from which they were respectively grown, or from any other production method, for example by transferring the elements using transfer techniques. Various arrangements of light-emitting elements may meet this definition of a monolithic matrix array, provided that the light-emitting elements have one of their main dimensions of elongation substantially perpendicular to a common substrate and that the spacing between the pixels, formed by one or more light-emitting elements grouped together electrically, is small in comparison with the spacings that are imposed in known arrangements of generally flat square chips soldered to a printed circuit board.

In particular, the light source according to one aspect of the invention may comprise a plurality of light-emitting elements distinct from one another and that are grown individually from the substrate, while being electrically connected so as to be selectively activatable, where applicable by subsets within which rods may be activated simultaneously.

According to one embodiment that is not shown, the monolithic matrix array comprises a plurality of light-emitting elements, of submillimeter dimensions, or even dimensions of less than 10 µm, which are arranged projecting from a substrate so as to form rods with an in particular hexagonal cross section. The light-emitting rods extend parallel to the optical axis of the lighting module when the light source is in position in the housing.

These light-emitting rods are grouped, in particular via electrical connections specific to each set, into a plurality of selectively activatable segments. The light-emitting rods originate on a first face of a substrate. Each light-emitting rod, here formed using gallium nitride (GaN), extends perpendicular, or substantially perpendicular, to, and thereby protrudes from, the substrate, which here is made of silicon, though other materials, such as silicon carbide, may be used without departing from the context of the invention. By way of example, the light-emitting rods could be made of an alloy of aluminum nitride and of gallium nitride (AlGaN), or of an alloy of aluminum, indium and gallium phosphides (AlInGaP). Each light-emitting rod extends along an axis of elongation defining its height, the base of each rod being arranged in a plane of the upper face of the substrate.

According to another embodiment that is not shown, the monolithic matrix array may comprise light-emitting elements formed by layers of epitaxial light-emitting elements, in particular a first layer of n-doped GaN and a second layer of p-doped GaN, on a single substrate, for example made of silicon carbide, and which is sliced (by grinding and/or ablation) to form a plurality of pixels respectively originating from one and the same substrate. The result of such a design is a plurality of light-emitting blocks all originating from one and the same substrate and electrically connected so as to be able selectively activatable from one another.

In one exemplary implementation according to this other embodiment, the substrate of the monolithic matrix array may have a thickness of between 100 µm and 800 µm, and in particular equal to 200 µm; each block may have a length and a width, each being between 50 µm and 500 µm, and preferably between 100 µm and 200 µm. In one variant, the length and width are equal. The height of each block is smaller than 500 µm, and preferably smaller than 300 µm. Finally, the exit surface of each block may be formed via the substrate on the side opposite the epitaxy. The distance separating contiguous pixels may be smaller than 1 µm, in particular smaller than 500 µm, and it is preferably smaller than 200 µm.

According to another embodiment that is not shown, both with light-emitting rods extending respectively projecting from one and the same substrate, as described above, and with light-emitting blocks obtained by slicing light-emitting layers superimposed on one and the same substrate, the monolithic matrix array may furthermore comprise a layer of a polymer material in which the light-emitting elements are at least partially embedded. The layer may thus extend over the entire extent of the substrate, or only around a given group of light-emitting elements. The polymer, which may in particular be silicone-based, creates a protective layer that allows the light-emitting elements to be protected, without hindering the diffusion of the light rays. Furthermore, it is possible to integrate, into this layer of polymer material, wavelength conversion means, for example luminophores, that are able to absorb at least some of the rays emitted by one of the elements and to convert at least some of said absorbed excitation light into an emission light having a wavelength that is different from that of the excitation light. Provision may be made without distinction for the luminophores to be embedded in the mass of the polymer material, or else to be arranged on the surface of the layer of this polymer material. It is also possible to vacuum-deposit phosphors on semiconductor chips, without the polymer layer. The light source may furthermore comprise a coating of reflective material in order to deflect light rays toward the exit surfaces of the pixelated source.

The light-emitting elements of submillimeter dimensions define, in a plane substantially parallel to the substrate, a given exit surface. It should be understood that the shape of this exit surface is defined depending on the number and the arrangement of the light-emitting elements that form it. It is thus possible to define a substantially rectangular shape of the emission surface, it being understood that the latter may vary and adopt any shape without departing from the context of the invention.

It is not ruled out for the selectively activatable emissive elements to be secondary light sources.

FIG. 1 shows one example of a projection obtained through the invention. In the case illustrated, this involves a projection of a checkerboard pattern (1 pixel out of 4 is turned on: 1 out of two in each turned-on row and one row out of two turned on, a turned-on row being offset by one pixel horizontally with respect to the immediately adjacent turned-on rows, such that one pixel out of four is turned on in each column) in a plane perpendicular to the optical axis, at a predetermined distance from the optical device, here at 25 m. The beam resulting from the projection is segmented in the sense that, in the projection plane, it is formed of a plurality of images each resulting from the light of an emissive element. The reference S shows one of these images.

The projection that is obtained has an image distribution corresponding to that of the pixels of the source. In this example, the contour is substantially rectangular, since it involves a source also having a rectangular shape. The long dimension is preferably oriented horizontally. The height of the images corresponds to the vertical. The ratio between these two dimensions may be of the order of 3, for example 3.15; it may result from the ratio of two juxtaposed blocks of LEDs each having for example a ratio of 1.6.

This projection is centered on the optical axis of the device, whose intersection with the projection plane is represented by the point O.

According to one possibility, the angular sector covered by the field of view of the produced beam is greater than 25°, or even greater than or equal to 30°.

Greater brightness of the images close to the point O, and a decrease in this brightness moving away therefrom, are immediately noted. At the same time, the contour of the images is more reduced close to the point O and expands, while being less sharp, away therefrom.

By way of example, the matrix array of pixels of the source 1 may have a rectangular shape having an aspect ratio of at least 3 between its largest dimension and its smallest dimension. In this elongated arrangement, cleverly arranged in the horizontal direction, the distortion effect will be accentuated in this horizontal direction, and smaller, or even negligible, in the other, vertical direction. The reference provided in FIG. 1 shows the width dimension of the images using the letter "l" and the height dimension of the images using the letter "h".

Figure 2:
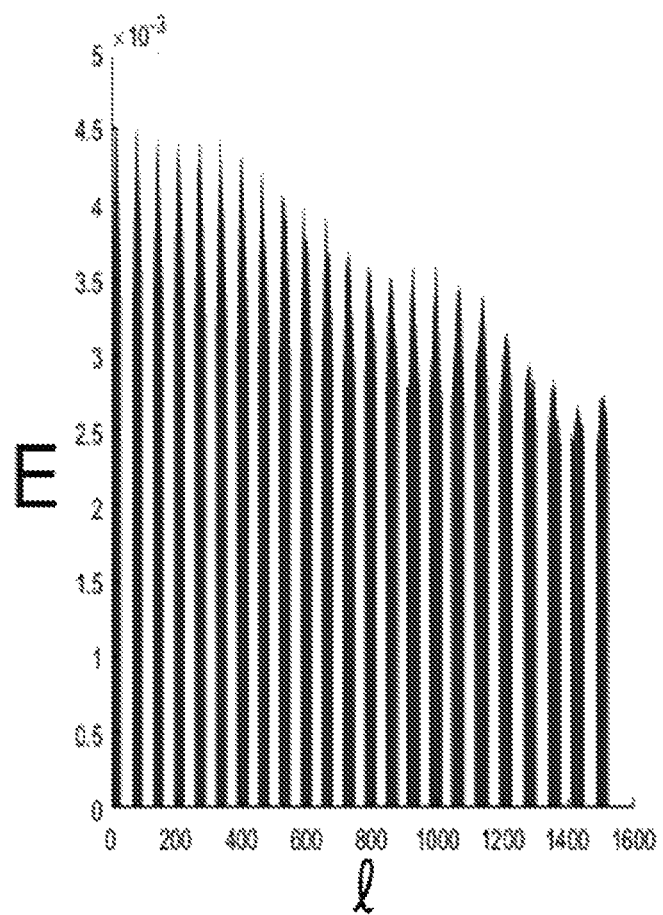
FIG. 2 shows the evolution of the light intensity and the width dimension of the images as a function of their distance from the optical axis.

FIG. 2 shows the evolution of the width dimension (given in mm) of the images of the activated pixels (here one out of two in the given example of a checkerboard pattern as in FIG. 1) and of their light intensity, moving away from point O horizontally to the right in this illustration. It should be noted that the images are narrower at the origin of the abscissas and that the width increases gradually. At the same time, the light intensity (given in an arbitrary scale on the ordinate) decreases, revealing the spreading of light over a larger image area.

With the aim of using conventional sources, it is advantageous for the emissive elements all to have the same shape and the same height and width dimensions. However, this choice is not limiting. In particular, in order to at least partially compensate for the effects of distortion in the vertical direction, the height dimension of the emissive elements may be gradually reduced moving away from the optical axis. This dimension reduction may follow a function equivalent, but inverse, to that of the distortion function produced by the optical device.

The optical device preferably makes it possible to adjust the growth function of the dimension of the images in order to obtain the desired light intensity modulation and the required visual field.

For any point of the matrix array of sources, it is possible to compute, from knowledge of the projection optic, the spot formed in the projection plane and the centroid of this image spot. It is therefore possible to link each point on the source matrix array to a point of the image (the centroid mentioned above) or, this being equivalent when the distance from the projection plane tends to infinity, to a direction (two angles) in the projected field. Moreover, if imagining an arbitrarily small rectangular emitter around the point of the source under consideration, it is possible to compute the projected image and define a magnification (ratio of the sizes of the sides of the projected image to the sizes of the sides of the hypothetical source). If consideration is now given only to points located along a line parallel to the largest side of the matrix array of sources and meeting the optical axis of the projection system, it is possible to determine two quantities in R for each point: the position of the centroid along the projection of the line of sources under consideration (and therefore, at infinity, a projection angle, in practice an angle in a horizontal plane) and the corresponding magnification. From these computations, which may be performed at any point of the line under consideration on the matrix array of sources, a gamma function of R in R linking an angle (in practice horizontal) in the projected field to a magnification is deduced. This function obviously applies to the computation of the size of the images of the pixels of the source. Its first derivative gives the increase in magnification of said pixels in the field. For an optic produced according to the invention, the derivative of the increase (second derivative of gamma) is zero for an angle 0 corresponding to a point on the optical axis of the projection optic.

Figure 3B:
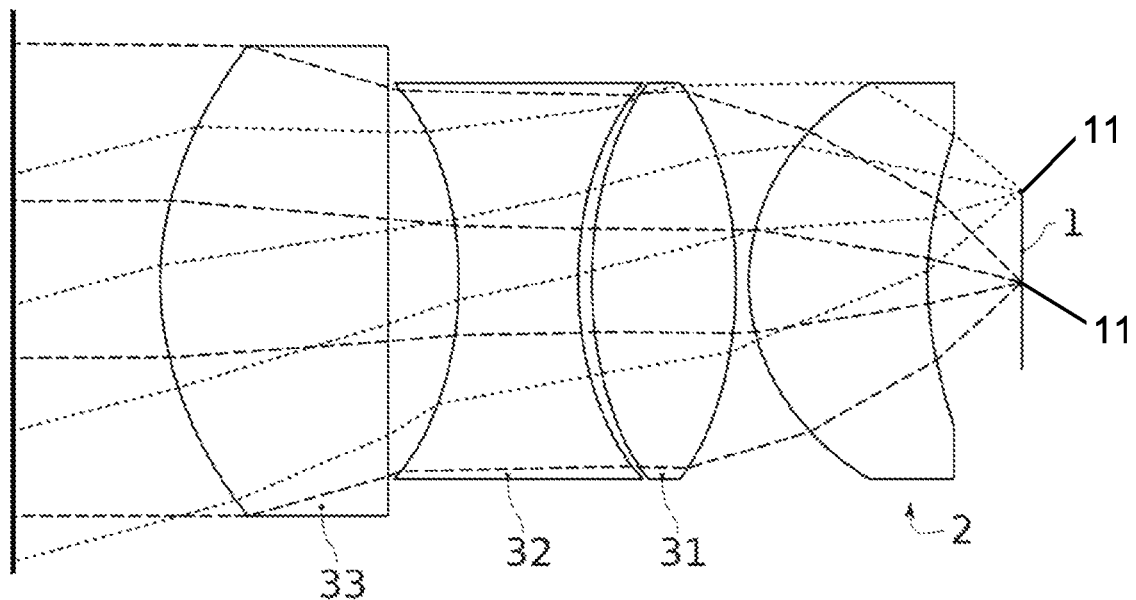

One embodiment of the projection system is provided with reference to FIG. 3A and FIG. 3B. FIG. 3A shows, from right to left, a light source 1 that may be of the type mentioned above, in particular in the form of a matrix array of emissive elements, a first optical unit, called input unit 2, and a second unit, called output unit 3.

The source 1 is advantageously centered on the optical axis of the optical device.

It will be understood that the unit 2 is configured to receive light from the source 1 via its entry face 21. The light leaving the unit 2 enters the unit 3, preferably directly. It emerges therefrom through the exit face of the unit 3 in order to be projected, preferably directly, into the space surrounding the vehicle.

In one preferred embodiment, the input unit 2 comprises, and preferably consists of, a lens. Advantageously, it is this part that provides the distortion. In the case illustrated, it is a meniscus lens, having an entry face 21 with a concave portion. The entry face may optionally be completely flat. The opposing face, forming the exit diopter, is convex and has a high curvature, which induces a distortion, in particular through the large inclination with respect to the normal to the surface of certain rays incident on the exit diopter, in particular toward the periphery of the optically useful surface of the lens. This may be a spherical face, thereby avoiding having to use complex and therefore expensive shapes.

Advantageously, the ratio between the radius of curvature of the exit face and the useful aperture (also called clear aperture) thereof (radius of the cross section of the base of the exit face) is less than 1.175. Typically, it is possible to choose a lens radius and a radius of curvature of the exit diopter of very close dimensions, thereby ensuring the greatest possible radius of curvature.

Advantageously, it is this diopter that has the greatest curvature in the whole of the optical device. Preferably, this curvature is at least 1.25 times greater than all of the other curvatures of the optical device.

It is desirable to use a high-index material for the lens of the unit 2. Preferably, the refractive index will be greater than 1.7. The Abbe number is preferably chosen within the range between 40 and 55. In particular, lenses from Schott® AG bearing the references LAK10, LAK21 and LAK43 or lenses indicated as equivalent thereto from other glassmakers are satisfactory.

FIG. 3A then provides one exemplary embodiment of the output unit 3. It is desirable for the optical power of this unit to be lower than the optical power of the unit 2, with a greater focal length than for the unit 2. Advantageously, the ratio between the optical power of the input unit 2 and the output unit 3 is greater than 1.6 and/or less than 2.2. It is moreover advantageous for the chromaticism of the unit 3 to be inverted (the relative position of the focal points corresponding to the plurality of wavelengths of light is inverse to that of the case of a converging refractive lens). This is possibly the case for the two units 2 and 3 of the system of FIG. 3A. One simple description of this chromaticism inversion is tantamount to stating that, for the unit 3 for example, the "red" focal point is closer to the lens 31 than the "blue" focal point and that the "green" focal point is located between the two. The unit 3 thus makes it possible to compensate for the chromatic aberrations generated by the unit 2 while maintaining a high optical power in the projection system. Indeed, high-performance motor vehicle lighting, implementing in particular the anti-glare high beam and dynamic bending light functions (ADB functions), requires an illuminated field that is as wide as possible; in other words, it is desirable for the image of the matrix array of sources to be as large as possible. Moreover, the cost of the matrix arrays of sources increases with their area; in other words, it is desirable for the matrix array of sources to be as small as possible. As a result, the focal length of the projection optic has to be low in order to have a large illuminated field and a small source. It is therefore necessary for the projection optic to have a high power. The optic of the invention achieves this condition by combining two converging elements of lower power than the required total power. The first optical element—the unit 2—of a device according to the invention is an element with high distortion and large aperture (it is necessary to capture as much luminous flux as possible, since it is sought to illuminate a large field with a small source—which therefore has a restricted luminous flux). By limiting this optical element to a reasonable number of lenses (one, possibly two, preferably spherical), it is impossible to simultaneously optimize the chromaticism thereof. As second element—unit 3—a convergent system (power sharing with the first element) with inverted chromaticism with respect to that of the first element is therefore implemented, in order to perform a chromaticism correction (essential for avoiding colorations in the projected image, which are completely undesirable). Since the first element—unit 2—behaves like a simple converging lens, the second element—unit 3—should be convergent and have inverted chromaticism.

In the case of FIG. 3A, this unit 3 comprises three lenses that follow one another along the path of the rays. Going up the path of the rays: the third lens 33 there is of plane convex shape, but it could also for example be biconvex. It may be formed from crown glass. It is followed by a biconcave lens 32 preferably made of flint glass or of polycarbonate. A stop device, limiting the useful aperture of the lens 32, may optionally be positioned on its entry face, that face directed toward the light source 1. Next, a lens 31 is in the example of biconvex shape; it may be made of crown glass.

It should be noted that it is advantageous to alternate between flint-glass and crown-glass lenses in this case, as in the following embodiments.

FIG. 3B provides one example of paths of light rays according to this embodiment, from various pixels of the source 1.

Figure 4A:
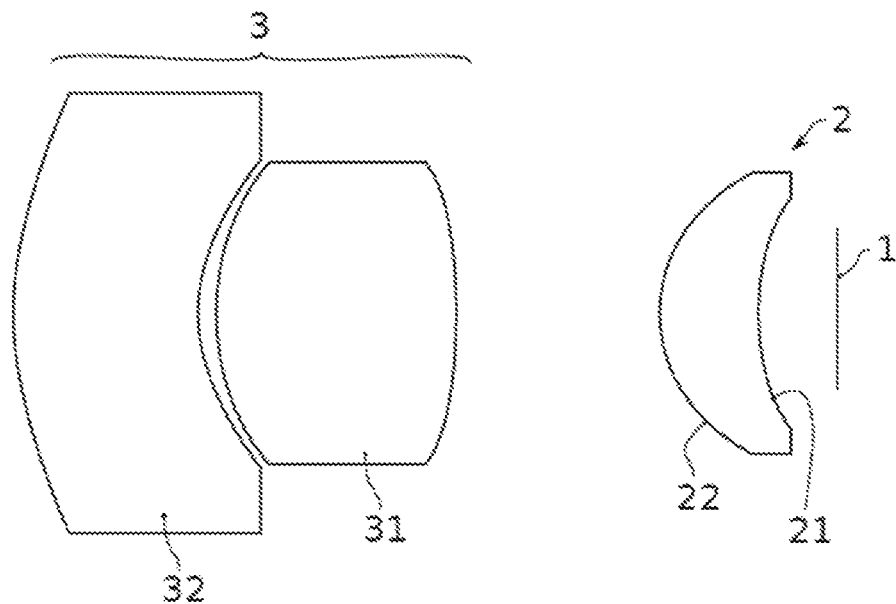
FIG. 4A and FIG. 4B show a second embodiment of an optical device.
Figure 4B:
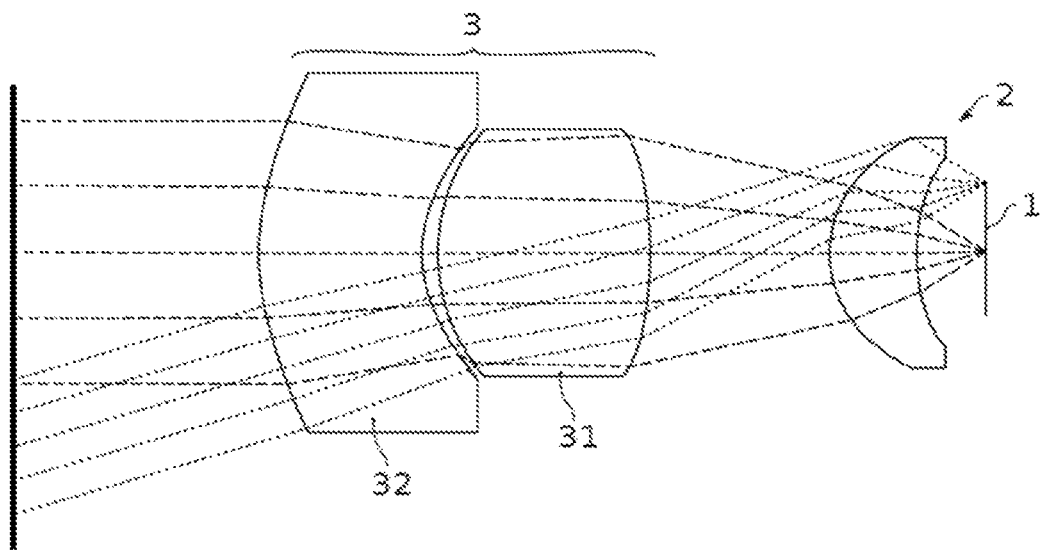

FIG. 4A and FIG. 4B give one variant of the situation described above. Indeed, the input unit 2 is not modified in its general form, but the output unit 3 here this time comprises two lenses. The lens 31 is a biconvex converging lens, advantageously made of crown glass with a high refractive index. A lens having a refractive index of 1.6 and an Abbe number of 60 may typically be used.

The other lens 32 is a diverging meniscus lens also having a high refractive index, advantageously made of flint glass. The concave face of the lens 32 forms its entry face and is directed facing toward the source 1. A material having a refractive index of 1.95 with an Abbe number of 20 may typically be used.

The corresponding path of the rays is shown in FIG. 4B.

Figure 5A:
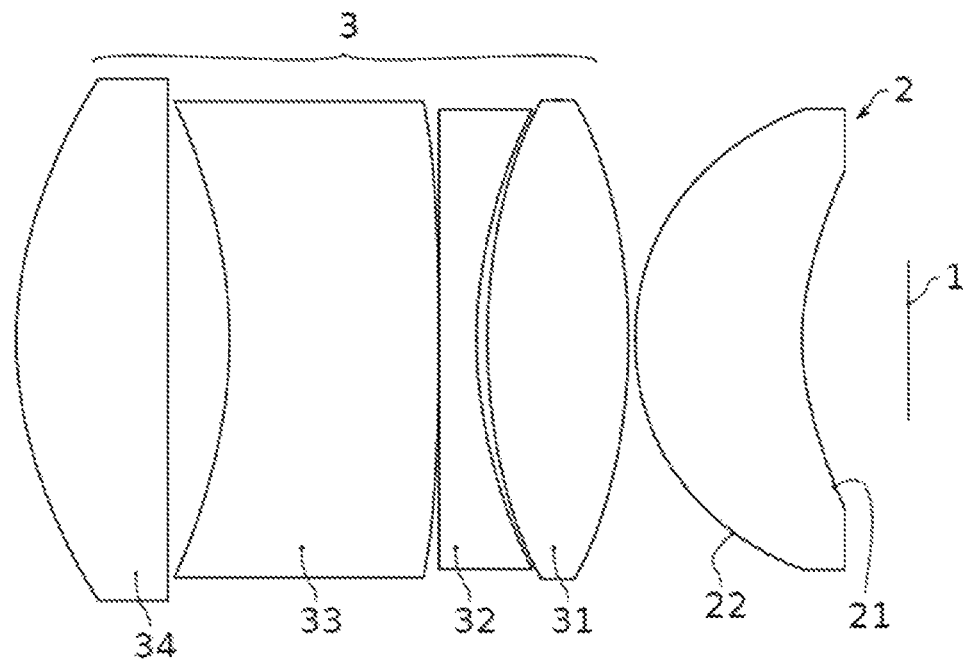
FIG. 5A and FIG. 5B show a third embodiment of an optical device.
Figure 5B:
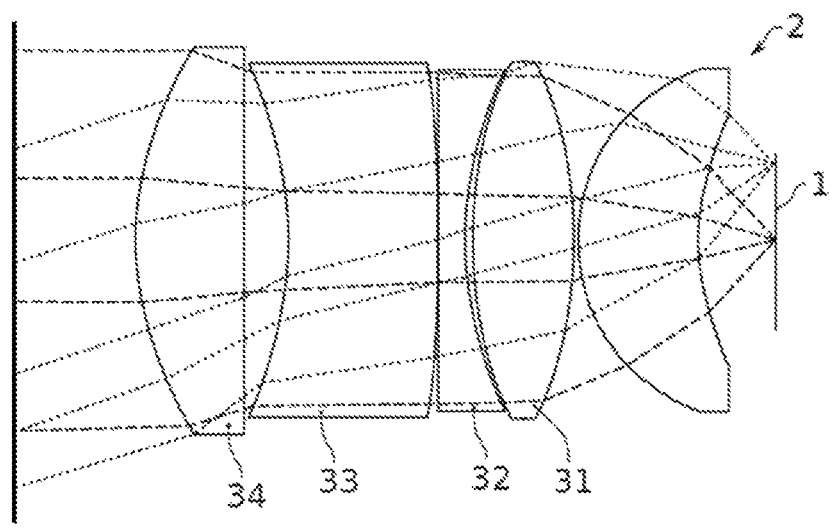

In the situation shown in FIG. 5A and FIG. 5B, the output unit 3 comprises four lenses. The unit 3 is thus organized there into two pairs of doublets. A first pair comprises a biconvex lens 31 and a concave plane lens 32, the concavity of this lens being oriented toward the lens 31. The second pair of lenses successively comprises a concave plane lens 33 and a convex plane lens 34, the concavity of the lens 33 being oriented toward the lens 34. The assembly typically has the structure of two Fraunhofer doublets placed back-to-back (the converging lens is made of crown glass and the diverging lens is made of flint glass); however, the doublets are not corrected here for chromaticism like true Fraunhofer doublets. It should be noted that, in this situation, the lens 2 is in the immediate vicinity of the unit 3.

FIG. 5B provides one example of a ray path for this configuration.

Figure 6:
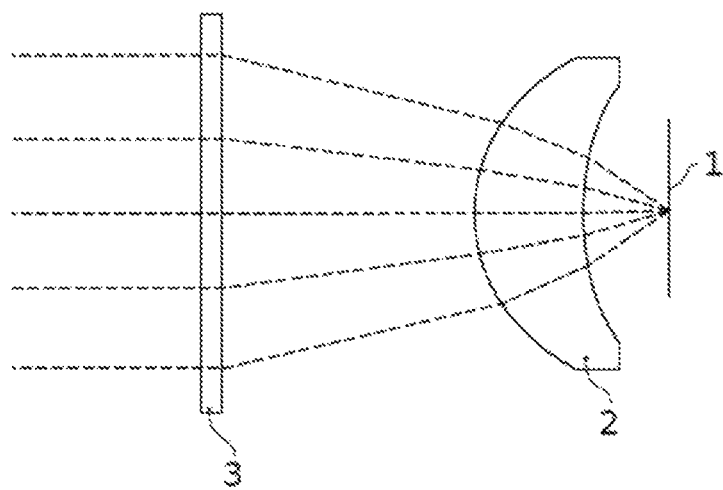
FIG. 6 shows another embodiment of an optical device.

Another solution for the second optical unit 3 is to use a diffractive optical element, for example in the form of a converging blazed grating, as shown in FIG. 6. Indeed, the converging diffractive elements have an inverse axial chromaticism in comparison with the converging refractive elements.

The combination of a light source 1 described above with an optical device comprising the units 2 and 3 provides a segmented resulting beam exhibiting the distortion corresponding to FIG. 1. Preferably, the system furthermore comprises a unit for driving the selective activation of the light-emitting elements in a differential manner, taking into account the variable size of the images of these elements. It should be understood that, to cover an area of predetermined size, more pixels will be needed in the vicinity of the center corresponding to the point O than at the periphery.

Optionally, the magnification ratio between each image around the optical axis and an image of an emissive element on the optical axis may be determined for each emissive element, so as to have a database used for computing, making it possible to approximate the surface of a region to be illuminated or turned off relative to the number (and to the identity) of the emissive elements necessary and sufficient to cover this region. The system may comprise computerized processing means, in particular with a processor and a non-volatile memory for storing computer program instructions enabling the operations of determining the emissive elements to be activated and the emissive elements to be deactivated according to the beam to be formed.

The invention is not limited to the embodiments described above and extends to all the embodiments covered by the claims.

The invention claimed is:

1. A lighting system comprising a pixelated light source equipped with a plurality of selectively activatable emissive elements each having a rectangular shape with a height dimension and a width dimension, the width dimension being identical for all of the emissive elements, and an optical device having an optical axis and configured to project an image of each of the emissive elements, wherein the optical device is configured such that the images have a width dimension that increases non-linearly moving away from the optical axis, with the optical device including an input optical unit receiving light from the plurality of emissive elements and an output optical unit receiving light from the input optical unit and projecting the images of each of the emissive elements, with the output optical unit including at least one convex lens receiving light before at least one concave lens and the input optical unit including a converging lens that has, on its exit face, a radius of curvature/useful aperture radius ratio of less than 1.175.

2. The system as claimed in claim 1, wherein a derivative of a function of the increase in the width dimension of an image with respect to the angular position of the image along an axis parallel to the width dimension of the total illuminated field is equal to zero on the optical axis.

3. The system as claimed in claim 1, wherein the converging lens is made of a material having a refractive index greater than 1.7.

4. The system as claimed in claim 1, wherein the output optical unit is convergent and exhibits inverted chromaticism.

5. The system as claimed in claim 1, wherein the focal length of the output optical unit is greater than the focal length of the input optical unit.

6. The system as claimed in claim 1, wherein the output optical unit includes at least two lenses.

7. The system as claimed in claim 1, wherein the output optical unit includes a diffractive optical element.

8. The system as claimed in claim 1, wherein the plurality of emissive elements forms a rectangular matrix array, the long dimension of the rectangular matrix array being directed along the width dimension.

9. The system as claimed in claim 1, wherein the width dimension is directed along the horizon line.

10. The system as claimed in claim 1, wherein the emissive elements have an identical height dimension.

11. The system as claimed in claim 1, further comprising a unit for driving the activation of each of the emissive elements, configured to produce at least one dark region in a projected beam by deactivating a group of adjacent emissive elements, the driving unit being configured to determine the number of emissive elements of the group of adjacent emissive elements corresponding to the dark region as a function of the width dimension of the emissive elements.

* * * * *